Jan. 10, 1950   M. F. CARGILL   2,493,857
BAKE OVEN CONVEYER
Filed March 27, 1948   2 Sheets-Sheet 1
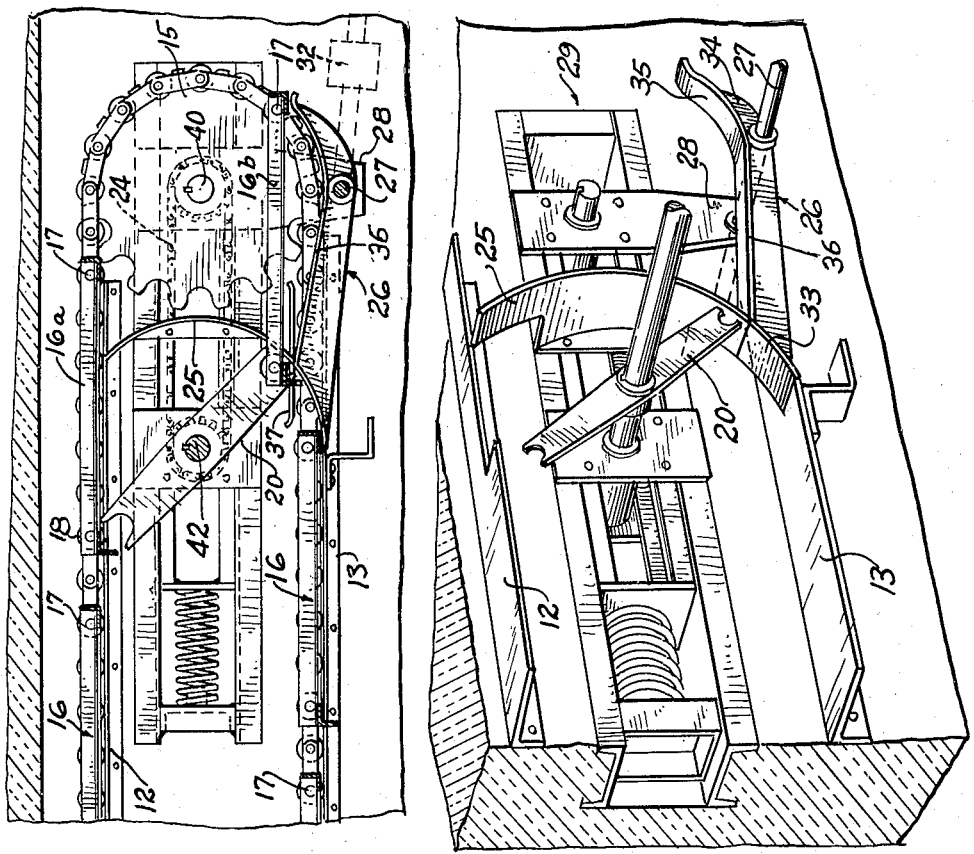
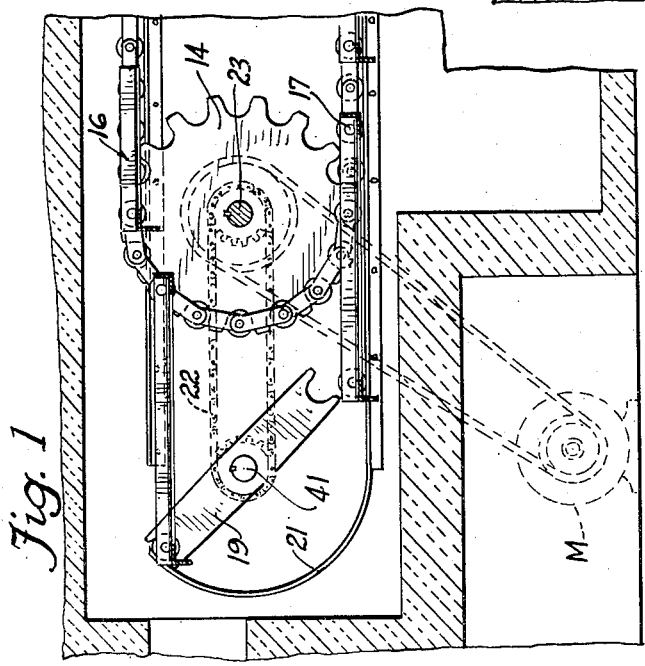
INVENTOR.
MAXWELL F. CARGILL
BY Sheridan, Davis
and Cargill
Attorneys Jan. 10, 1950          M. F. CARGILL          2,493,857
                      BAKE OVEN CONVEYER
Filed March 27, 1948                        2 Sheets-Sheet 2
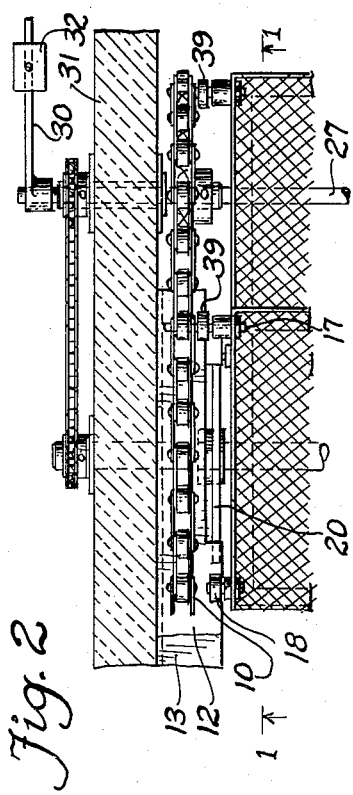
Fig. 2
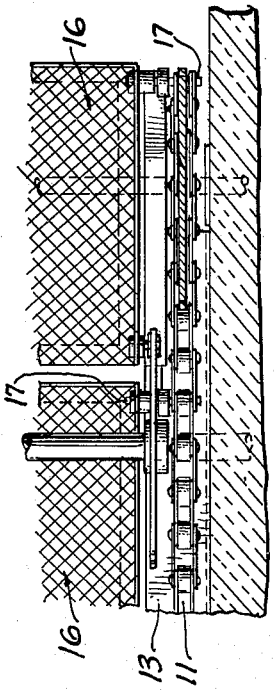
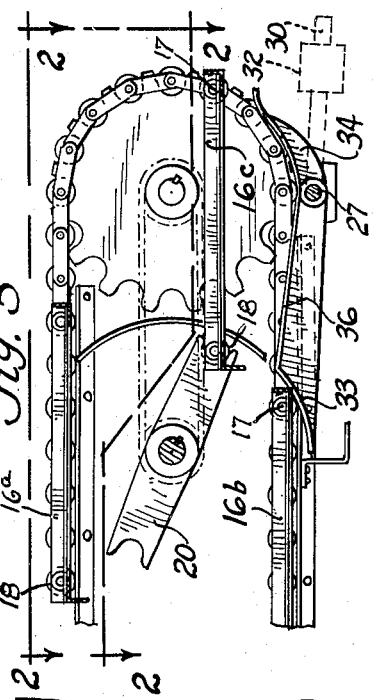
Fig. 5
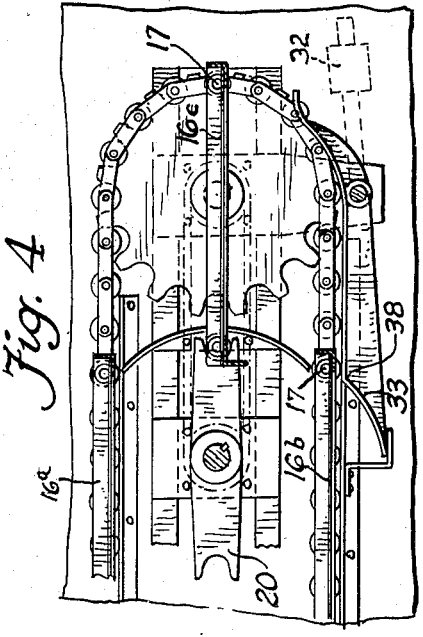
Fig. 4
INVENTOR.
MAXWELL F. CARGILL
BY Sheridan, Davis
and Cargill
Attorneys Patented Jan. 10, 1950

2,493,857

UNITED STATES PATENT OFFICE 2,493,857

BAKE OVEN CONVEYER

Maxwell F. Cargill, Maywood, Ill., assignor to Middleby-Marshall Oven Company, Chicago, Ill., a corporation of Illinois Application March 27, 1948, Serial No. 17,429

5 Claims. (Cl. 198—138)

This invention relates to improvements in bake oven conveyors, and particularly to tray conveyors of bake ovens of the general construction shown in the Nalbach and Haupt U. S. Patent No. 2,369,840, granted February 20, 1945, for Bake oven conveyors.

The present oven, as well as the oven of the construction shown in the above mentioned patent, is of the "traveling" type that it is provided with a conveyor that carries products to be baked from the loading end of the oven structure to the other end and thence back to the loading end, the pans in which products are placed being carried on trays that remain in a horizontal position as the trays move arcuately about sprockets at the ends of the conveyor in moving from one run of the conveyor to the other. During such arcuate movement of the trays from upper to lower horizontal tracks and vice versa, in ovens of the type mentioned, the trays are guided or stabilized in horizontal relation by means of rotary transfer arms that cooperate with arcuate tracks.

In the oven structure shown in the patent mentioned, there are provided pivotally movable track arms or track switches that are cam operated to and from positions bridging gaps between the lower tracks and adjacent curved tracks adjacent one end of the conveyor in order to permit the passage beneath the curved tracks of the pivoted ends of the trays while directing the opposite or free ends of the trays across the gaps as the trays move arcuately, in horizontal relation, from an upper horizontal to a lower horizontal track or vice versa.

In the present invention, such track switches are employed, but for the purpose of avoiding the use of a cam or cams for operating the track switches in properly timed relation with respect to the movement of successive trays to the switching station, the present improvement dispenses with such cam operating means and substitutes therefor switch devices that are controlled directly by the successive trays as they approach a transfer position thereby avoiding the likelihood of damage to the conveyor mechanism resulting from inoperation of the cams or from improperly timed or calibrated cams.

The principal object of the present invention, therefore, is to provide an oven conveyor structure having track switches which are operated to and from switching positions by the successive trays as each approaches the switches for transfer of the unpivoted end thereof across the gap between the bottom horizontal track and the arcuate curved track.

Other objects of the invention relate to various features of construction of the tray operated switches and associated parts which will be apparent from a consideration of the following specification and accompanying drawings wherein:

Figure 1 is a broken sectional view of an oven conveyor structure, which is illustrative of the invention, the section being taken along line 1—1 of Fig. 2;

Fig. 2 is a broken plan view of the right hand portion of the structure shown in Fig. 1, illustrating portions of the upper end portions of lower sections of the conveyor mechanism, as along the planes indicated by lines 2—2 of Fig. 5;

Fig. 3 is a broken perspective view illustrating one of the two tray actuated track switches of the oven structure; and Figs. 4 and 5 are progress views showing the switches in different tray operated position in relation to the actuating and to the succeeding tray.

In Fig. 2 of the drawings, a pair of endless chains 10, 11 is shown which, in their horizontal runs, travel along upper and lower tracks 12 and 13 and around the front and rear sprockets at the ends of the conveyor, one each of the sprockets 14 and 15 being shown in Fig. 1. The tracks are supported at the inner side walls of the oven. Located between the chains are trays indicated generally by the numeral 16, each of which at one end, herein designated the rear end for clarity of description, is pivotally secured to the chains, at opposed points, by extended link pins 17. The forward end of each tray is provided with rollers 18 that roll along the tracks in paths located inwardly of the chains and upon the inner top portions of the tracks. While the rear pivoted ends of the trays are supported by the respective chain links as the latter pass around the sprockets at the ends of the conveyor from one run of the conveyor to the other, one pair of which is driven by means of a motor M, as shown in Fig. 1, the forward unpivoted ends of the trays are engaged and carried in arcuate paths to retain the trays in horizontal relation during the arcuate movement, by means of two pairs of transfer arms 19 and 20, the former being at the forward end of the oven and the latter at the rear. Associated with the forward transfer arms 19 is a pair of curved tracks 21 which cooperates with the arms 19 as the latter engage a pair of forward rollers of a tray and move the latter arcuately for maintaining the tray in horizontal or stabilized relation as the rear end of the tray is moved about the sprockets 14 in passing from one horizontal run of the conveyor to the other. As will be seen, the conveyor may be operated in either direction. The transfer arms 19 are driven by chains 22 on opposite sides of the oven from the shaft 23 of the forward sprockets 14. One of the chains 22 only is shown in Figs. 1.

At the rear end of the conveyor the pair of transfer arms 20 is driven in timed relation with respect to the sprockets by a chain 24 or the like. Associated with the rear transfer arms 20 is a pair of arcuate tracks 25. At the upper ends of these arcuate tracks the respective transfer arms engage the forward rollers 18 of a tray 16 as the pivoted end thereof is about to move about the rear sprockets 15. The forward rollers mentioned pass from the upper track 12 through cutouts or recesses in the upper track, as described in the said patent, as the trays begin to move in a downward arcuate direction or as the trays complete an upward arcuate direction, as will be obvious.

In Fig. 1 a tray 16, identified by exponent a, upon moving sufficiently to the right will be carried at the pivoted end about the sprockets 15 while the unpivoted forward end will be carried by the transfer arms downwardly along the curved track 25.

Since the curved tracks 25 at the rear of the oven must terminate at a level above the lower tracks 13 to provide gaps that enable the extended link pins 17 of the trays to pass therebeneath to and from the respective rear sprockets, track switches were provided in the structure shown in said patent which were cam operated to and from the switching position wherein they constituted extensions of the curved tracks 25 for carrying the unpivoted ends of the trays across the gaps between the lower ends of the curved tracks and the lower horizontal tracks. The switches mentioned were cam operated and, when in the upper position mentioned, they bridged the gaps, while in the lower position they permitted the rear extended link pins 17 to pass along the lower horizontal tracks without obstruction. The timing of the switch movements with respect to the movements of the trays is important in insuring smooth operation of the trays in horizontal or stabilized relation and for avoiding engagement of the switches by the extended link pins which might cause substantial damage to the conveyor mechanism as well as to the products then in the oven. Hence, the cams, above mentioned, have been dispensed with in the present mechanism and track switches have been provided which have formed as integral parts thereof, means which are engaged by the link pins of the trays in succession for supporting the switches in switching relation for directing the unpivoted forward ends of the trays across the switch gaps and are moved out of switching position by the extended link pins at the rear of the respective trays to enable the latter to pass through he gaps in eiher direction.

The improved track switch devices mentioned are indicated generally by numeral 26, there being one at each side of the oven and each mounted on a pivotal shaft 27 which is carried by brackets 28 that are part of the spring actuated tensioning means 29, one for each chain, that accommodate the expansion and contraction of the chains in response to temperature changes as described in the patent above mentioned. The shaft 27 is shown provided with an arm 30 at one end exteriorly of the insulated wall 31 of the oven and carrying a counterweight 32 that tends to restore the switch devices to the horizontal position. If desired, both or but one of the switches may be provided directly with an attached or integral counter-weight, but the arrangement shown is preferred.

The switch devices mentioned, one only being shown in Figs. 1, 4 and 5, are adapted to close the gaps between the lower tracks 13 and the lower ends of the curved tracks 25 for enabling the respective transfer arms 20 to direct the unpivoted forward ends of the trays 16 across the gaps as the trays move arcuately in succession to or from the lower track. The pivoted switch devices likewise are movable out of the normal position to enable the rear extended link pins, which pivotally secure the rear ends of the trays to the conveyors, to move through the gaps in either direction beneath the arcuate tracks.

The switch device 26, shown in Figs. 1, 4 and 5, comprises a switch element 33 which is curved in conformity with the respective curved track 25, and when the device is in normal or horizontal position, the element 33 closes the gap between the lower end of the curved track and the respective lower horizontal track. Each switch device is provided with a lever arm 34 extending rearwardly and is provided with a portion 35 that is curved or is of arcuate shape and lies normally in a position for engagement with the respective extended link pin 17 of each tray as the same moves about the lower portion of the adjacent chain sprocket 15, as illustrated in Fig. 1. The length of the switch device is such that a link pin of a tray, such as tray 16b of Fig. 1, in moving downwardly and to the left as viewed in Fig. 1, will engage the curved rear portion 35 of the device at least an instant before the forward roller 18 of the forward end of the tray passes from the curved track 25 onto the switch element 33. As the link pin moves to the left in Fig. 1, it remains in contact with the lever arm 34 and thus retains the device in position for supporting the switch element in elevated position as the forward roller moves from the curved track 25 into contact with the horizontal track 13. As the tray 16b continues to move to the left, as viewed in Fig. 1, the extended link pins each will engage an inclined or cam portion 36 of the device and depress the respective elements 33 sufficiently to enable the extended pins to remain in contact with the lower tracks 13. Guard rails 37 (not shown in Fig. 3) extending laterally from the adjacent oven wall over the inner portion of the respective chain, may be provided for preventing lifting of the adjacent chain portion from the lower track as the respective link pin depresses the switch element.

In Fig. 4, the position of the switch device is shown in its maximum counter-clockwise tilted position, that is, the approximate position that it assumes as the rear link pin of a tray passes over the element. The succeeding tray 16c will at that instant be in the relative position shown in Fig. 4. As the tray 16b moves farther to the left over the apex 38 of the switch device, the device is returned clockwise to normal position by the weight 32 or equivalent element. The relative position of the succeeding tray 16c is indicated in Fig. 5 when the next preceding tray 16b has advanced to a position wherein the link pins thereof permit the switches to begin the return movement to the horizontal or normal position.

In the event the conveyors are moving in the direction opposite to that mentioned, the link pins 17 of each tray will be in advance of the rollers 18 and as the link pins engage the switch elements 33, they cam the device in a counter-clockwise direction until the apex of each device has been lowered to the plane of the lower tracks as will be clear. The devices then are returned to the horizontal position by the weight, if such is used, and are retained in that position by contact thereof by the respective link pins until the forward rollers have been guided by the elements 33 across the gaps and into contact with the lower ends of the curved tracks 25.

By the arrangement described, it is seen that each tray itself, by contact of the link pins thereof with the respective switch levers, retains the switch elements in switching position for supporting contact with the forward rollers of the tray as the rollers move across the gaps regardless of the direction of movement of the conveyor. The structure described eliminates use of switch operating cams that must be calibrated or timed for movements with respect to each successive tray since each tray itself, as it approaches a switching position, controls the switch device. The link pins mentioned preferably are provided with rollers 29 for reducing friction at the points of contact with the switch devices. It will be understood that the rear sprockets 15 are mounted upon stub shafts, indicated at 40 to enable the trays to move as described at the rear end of the oven while the shaft 23 may, if desired, be common to the two forward sprockets 14. Likewise, the forward transfer arms 19 are mounted on stub shafts 41 while the shaft 42 of the rear transfer arms may be common to those arms.

While I have shown and described a structure that is illustrative of the invention, various changes in details thereof may be resorted to within the spirit of the invention defined by the following claims.

I claim:

1. In a bake oven conveyor comprising a pair of endless chains, front and rear sprockets over which the chains pass at the ends of the conveyor, horizontal upper and lower tracks supporting the upper and lower runs of the chains between the respective front and rear sprockets, trays each having laterally extending pivots securing one end of the tray to opposed portions of the chains and provided with laterally extending rollers at the opposite ends for contact with the tracks for supporting the trays in horizontal relation as the trays move along said tracks, arcuate tracks each located between the upper and lower horizontal tracks adjacent one end of the conveyor and spaced at the lower ends from the lower tracks to provide gaps through which the pivoted ends of the trays can pass in succession along the lower horizontal tracks, transfer means for engaging the rollers of each tray in succession for moving the same along said arcuate tracks as the trays move from one run of the conveyor to the other, and pivotally mounted switch devices each comprising a switch element movable into one of said gaps for cooperation with the respective transfer means for guiding the rollers of the trays in succession across said gaps, each device having a lever arm extending longitudinally of the conveyor into positions for engagement with each tray in succession for supporting the switch elements in normal switching position in said gaps as the rollers of the respective trays pass across the gaps.

2. In a bake oven conveyor comprising a pair of endless chains, front and rear sprockets over which the chains pass at the ends of the conveyor, horizontal upper and lower tracks supporting the upper and lower runs of the chains between the respective front and rear sprockets, trays each having laterally extending pivots securing one end of the tray to opposed portions of the chains and provided with laterally extending rollers at the opposite ends for contact with the tracks for supporting the trays in horizontal relation as the trays move along said tracks, arcuate tracks each located between the upper and lower horizontal tracks adjacent one end of the conveyor and spaced at the lower ends from the lower tracks to provide gaps through which the pivoted ends of the trays can pass in succession along the lower horizontal tracks, transfer means for engaging the rollers of each tray in succession for moving the same along said arcuate tracks as the trays move from one run of the conveyor to the other, switch elements for each of said gaps movable out of switching position in the gaps by the pivoted portion of each tray as such portions approach the gaps, and means comprising a lever arm for each switch element engageable by the pivoted portions of each tray for moving the respective switch elements into the gaps for cooperation with said transfer means in directing the rollers at the other ends of the respective tray across said gaps.

3. In a bake oven conveyor comprising a pair of endless chains, front and rear sprockets over which the chains pass at the ends of the conveyor, horizontal upper and lower tracks supporting the upper and lower runs of the chains between the respective front and rear sprockets, trays each having laterally extending pivots securing one end of the tray to opposed portions of the chains and provided with laterally extending rollers at the opposite ends for contact with the tracks for supporting the trays in horizontal relation as the trays move along said tracks, arcuate tracks each located between the upper and lower horizontal tracks adjacent one end of the conveyor and spaced at the lower ends from the lower tracks to provide gaps through which the pivoted ends of the trays can pass in succession along the lower horizontal tracks, transfer means for engaging the rollers of each tray in succession for moving the same along said arcuate tracks as the trays move from one run of the conveyor to the other, and counter weighted switch devices comprising switch elements normally located in switching position within said gaps and movable therefrom by the pivots of the trays out of the gaps to permit the pivots to pass through the gaps and provided with arms engageable by the pivots of each tray for retaining the switch elements against movement from the switching position for cooperation with the transfer means as the latter move the rollers of the respective trays across said gaps.

4. In a bake oven conveyor comprising a pair of endless chains, front and rear sprockets over which the chains pass at the ends of the conveyor, horizontal upper and lower tracks supporting the upper and lower runs of the chains between the respective front and rear sprockets, trays each having laterally extending pivots securing one end of the tray to opposed portions of the chains and provided with laterally extending rollers at the opposite ends for contact with the tracks for supporting the trays in horizontal relation as the trays move along said tracks, arcuate tracks each located between the upper and lower horizontal tracks adjacent one end of the conveyor and spaced at the lower ends from the lower tracks to provide gaps through which the pivoted ends of the trays can pass in succession along the lower horizontal tracks, transfer means for engaging the rollers of each tray in succession for moving the same along said arcuate tracks as the trays move from one run of the conveyor to the other, a switch device associated with each arcuate track comprising curved switch elements each movable into and out of switching position within said gaps, and pivoted levers each supporting one of said curved switch elements and provided with an arm extending longitudinally along the adjacent run of the chain, said levers being engageable by the pivots of each tray as the latter moves into a given position for retaining the switch elements in switching position for cooperation with said transfer means in moving the rollers of the respective trays across said gaps, and means on said devices engageable by the pivots of each tray for moving the elements out of the switching positions as the pivots move horizontally through said gaps.

5. In a bake oven conveyor comprising a pair of endless chains, front and rear sprockets over which the chains pass at the ends of the conveyor, horizontal upper and lower tracks supporting the upper and lower runs of the chains between the respective front and rear sprockets, trays each having laterally extending pivots securing one end of the tray to opposed portions of the chains and provided with laterally extending rollers at the opposite ends for contact with the tracks for supporting the trays in horizontal relation as the trays move along said tracks, arcuate tracks each located between the upper and lower horizontal tracks adjacent one end of the conveyor and spaced at the lower ends from the lower tracks to provide gaps through which the pivoted ends of the trays can pass in succession along the lower horizontal tracks, transfer means for engaging the rollers of each tray in succession for moving the same along said arcuate tracks as the trays move from one run of the conveyor to the other, and movable switch devices each provided with a switch element adapted to be moved by gravity into switching position within said gap for cooperation with the transfer means in directing the rollers of successive trays across said gaps and lever arms supporting said elements and engaged by the pivots of the respective trays for retaining said elements against movement from the gaps during the transfer of the respective rollers across the gaps.

MAXWELL F. CARGILL.

REFERENCES CITED

The following references are of record in the file of this patent:

UNITED STATES PATENTS

| Number | Name | Date |
|---|---|---|
| 2,390,455 | Nalbach | Dec. 4, 1945 |